United States Patent
Yang et al.

(10) Patent No.: US 10,532,337 B2
(45) Date of Patent: Jan. 14, 2020

(54) CONTAINER WITH HEATING DEVICE AND SAFETY DEVICE

(71) Applicant: ASIA PACIFIC FUEL CELL TECHNOLOGIES, LTD., Miaoli (TW)

(72) Inventors: Jefferson Y S Yang, Orange, CA (US); Wu-Yao Wei, Miaoli (TW)

(73) Assignee: ASIA PACIFIC FUEL CELL TECHNOLOGIES, LTD., Miaoli (TW)

( * ) Notice: Subject to any disclaimer, the term of this patent is extended or adjusted under 35 U.S.C. 154(b) by 552 days.

(21) Appl. No.: 15/241,734

(22) Filed: Aug. 19, 2016

(65) Prior Publication Data

US 2017/0050160 A1    Feb. 23, 2017

(30) Foreign Application Priority Data

Aug. 21, 2015   (TW) .............................. 104127411 A

(51) Int. Cl.
*B01J 7/00* (2006.01)
*F17C 11/00* (2006.01)
(Continued)

(52) U.S. Cl.
CPC ............. *B01J 7/00* (2013.01); *B01J 19/0006* (2013.01); *B01J 19/0013* (2013.01); *C01B 3/001* (2013.01); *F17C 11/005* (2013.01); *B01J 2219/0027* (2013.01); *B01J 2219/00135* (2013.01); *B01J 2219/00162* (2013.01); *F17C 2205/0323* (2013.01);
(Continued)

(58) Field of Classification Search
CPC ...... B01J 7/00; B01J 19/0006; B01J 19/0013; B01J 2219/00162; B01J 2219/0027; B01J 2219/00135; F17C 11/005; F17C 2205/0323; F17C 2205/0341; F17C 2221/012; F17C 2270/0763; F17C 2260/031
USPC ......................................................... 392/441
See application file for complete search history.

(56) References Cited

U.S. PATENT DOCUMENTS

2002/0125267 A1   9/2002 Gruenwald
2004/0166385 A1   8/2004 Morse et al.
(Continued)

FOREIGN PATENT DOCUMENTS

| JP | 2005282828 | 10/2005 |
| WO | 2013191575 | 12/2013 |
| WO | 2014158091 | 10/2014 |

*Primary Examiner* — Brian W Jennison
(74) *Attorney, Agent, or Firm* — Kirton McConkie; Evan R. Witt

(57) ABSTRACT

A container is disclosed. The container includes a canister body, at least one heating device and at least one safety device. The canister body includes an inner space for storing a gas storage material. The at least one heating device is accommodated within an inner space of the canister body for heating the gas storage material, so that the gas storage material releases a gas. The at least one safety device is connected with the corresponding heating device and installed on an end part of the canister body. When a temperature of the inner space is higher than a predetermined temperature value or a pressure of the inner space is higher than a predetermined pressure value, a portion of the gas is released through the safety device.

18 Claims, 16 Drawing Sheets

(51) Int. Cl.
 *B01J 19/00* (2006.01)
 *C01B 3/00* (2006.01)
(52) U.S. Cl.
 CPC .......................... *F17C 2205/0341* (2013.01); *F17C 2221/012* (2013.01); *F17C 2260/031* (2013.01); *F17C 2270/0763* (2013.01)

(56) References Cited

U.S. PATENT DOCUMENTS

| | | | | |
|---|---|---|---|---|
| 2006/0127304 | A1* | 6/2006 | Fujii | B01J 20/04 |
| | | | | 423/644 |
| 2006/0255589 | A1* | 11/2006 | Yang | F16L 37/23 |
| | | | | 285/276 |
| 2011/0252962 | A1 | 10/2011 | Von Helmolt et al. | |
| 2012/0031084 | A1* | 2/2012 | Perrin | B60K 15/061 |
| | | | | 60/299 |
| 2012/0183281 | A1* | 7/2012 | Sato | B60S 1/488 |
| | | | | 392/441 |

\* cited by examiner

CONTAINER WITH HEATING DEVICE AND SAFETY DEVICE

FIELD OF THE INVENTION

The present invention relates to a container, and more particularly to a container with a heating device and a safety device.

BACKGROUND OF THE INVENTION

A fuel cell is a device that converts the chemical energy of a fuel into electricity through a chemical reaction with air. Consequently, the fuel cell is categorized as a new energy source. The fuel for the anode electrode of the fuel cell includes any type of hydrocarbon such as natural gas, methanol, ethanol (alcohol), product from water electrolysis, marsh gas, or the like.

The fuel for the anode of the fuel cell is usually filled in a container with a gas storage material. For example, the fuel is hydrogen gas, the container is a gas storage canister, and the gas storage material is metal hydride. Consequently, the fuel is adsorbed and stored by the gas storage material. For using the fuel, the container should be properly heated to release the fuel to the application device. Consequently, the fuel cell manufacturers make efforts in designing novel methods for stably releasing the fuel from the container.

For example, a method of heating the container was disclosed in U.S. Pat. No. 6,418,275, entitled "Supply device for use with a hydrogen source". Conventionally, a water tank is located at the outside of a container. After the cool water in the water tank is heated by the waste heat from the fuel cell, the hot water is guided to the container through a circulated piping system. Consequently, the container is heated to release the fuel. However, the conventional technology still has some drawbacks. For example, if the fuel cell system is operated in a low temperature environment (e.g., in winter or in the Frigid Zone), the cold start of the full cell system is usually unsuccessful. Since the container is unable to acquire the heat energy in the beginning, the fuel cannot be released to the anode of the fuel cell. This is why the fuel cell cannot be successfully turned on. Moreover, the above heating method is an indirect heating method. The indirect heating method has many drawbacks. For example, the efficacy of thermal conduction is deteriorated, the power loss is increased, and the container or the gas storage material cannot be directly heated.

Therefore, the present invention provides a container with a heating device and a safety device in order to solve the above drawbacks.

SUMMARY OF THE INVENTION

An object of the present invention provides a container with a heating device. The heating device provides heat energy to a gas storage material effectively and directly. Consequently, the power loss is minimized and the gas is effectively released and utilized.

Another object of the present invention provides a container with a safety device. When the internal temperature or internal pressure is higher than a predetermined value, a portion of the gas is released from the canister body of the container. Consequently, the canister body can be effectively protected.

In accordance with an aspect of the present invention, there is provided a container. The container includes a canister body, at least one heating device and at least one safety device. The canister body includes an inner space for storing a gas storage material. The at least one heating device is accommodated within an inner space of the canister body for heating the gas storage material, so that the gas storage material releases a gas. The at least one safety device is connected with the corresponding heating device and installed on an end part of the canister body. When a temperature of the inner space is higher than a predetermined temperature value or a pressure of the inner space is higher than a predetermined pressure value, a portion of the gas is released through the safety device.

In an embodiment, the heating device is an electric heating bar or a heater.

In an embodiment, a heating body of the heating device is covered by a thermally conductive metal layer.

In an embodiment, the heating device is a positive temperature coefficient thermistor.

In an embodiment, the heating device include an adapter, and the heating device is assembled with the safety device through the adapter.

In an embodiment, the heating device includes a sleeve, a plug, at least two sealing rings, an adapter with a supporting part, a nut, and a heating element having a wire part. The wire part of the heating element is penetrated through the plug, and then inserted into the sleeve, penetrated through one of the two sealing rings and the adapter with the supporting part, and protruded out of the sleeve. Two ends of the sleeve are assembled with the adapter and the nut through the two sealing rings respectively. Consequently, the heating element is installed in an interior of the sleeve and sealed by the adapter and the nut.

In an embodiment, the sleeve is made of thermally-conductive material or metal material.

In an embodiment, the safety device comprises a main body with a receptacle. A gasket, a valve, a spring, a fusible plug block and a hollow-type adjustment screw are received within the receptacle.

In an embodiment, the hollow-type adjustment screw comprises a flat part and a slot part.

In an embodiment, an outer diameter of each of the gasket, the valve, the spring and the fusible plug block is smaller than an inner diameter of the receptacle. Consequently, a channel is defined by a gap between an inner surface of the receptacle and the gasket, the valve, the spring and the fusible plug block.

In an embodiment, when the temperature is higher than the predetermined temperature value or the pressure is higher than the predetermined pressure value, a portion of the gas is released to an outside of the safety device through the channel.

In an embodiment, when the temperature of the inner space reaches the predetermined temperature value, the fusible plug block is molten.

In an embodiment, the safety device comprises an O ring and a packing nut, and the heating device is fixed on the safety device through the O ring and the packing nut.

In an embodiment, an intermediate segment of the main body of the safety device comprises plural gas passageways.

In an embodiment, the safety device further comprises a filter, and the filter is arranged around the plural gas passageways to cover the plural gas passageways.

In an embodiment, the end part of the canister body is further connected with a handle, and the container is electrically connected with a power supply unit through the handle.

In an embodiment, the heating device further comprises a wiring part, which is protruded out of the safety device.

In an embodiment, the container is a gas storage canister.

In an embodiment, the container is a hydrogen storage canister.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
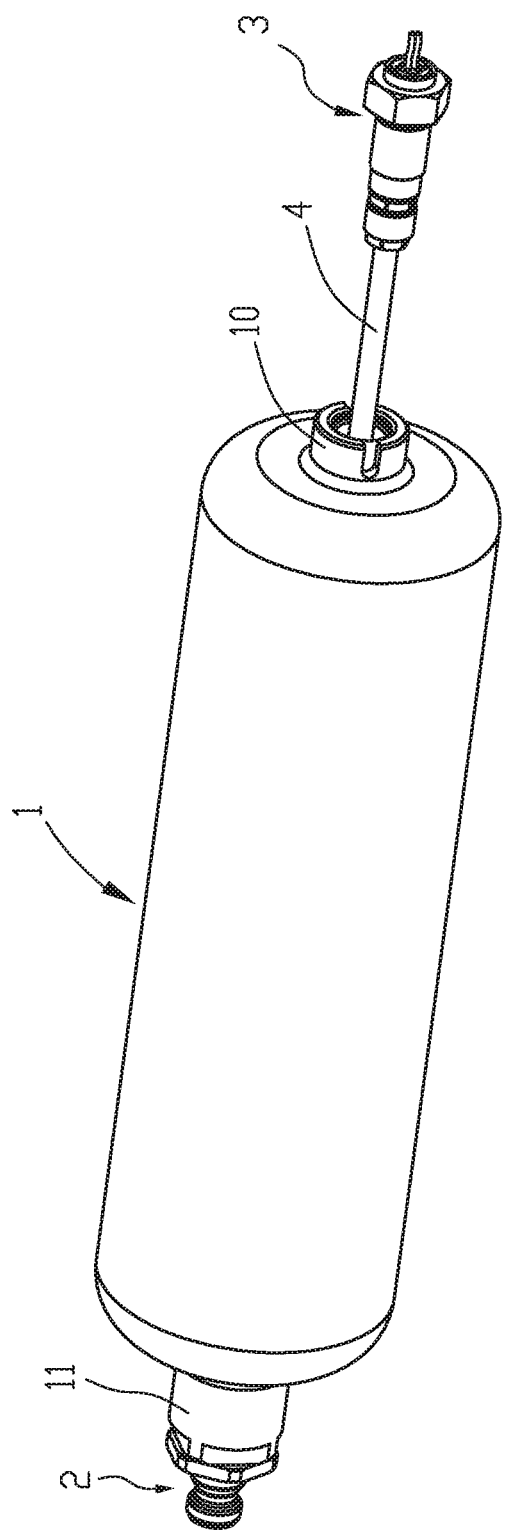
FIG. 1 is a schematic perspective view illustrating the outer appearance of a container according to a first embodiment of the present invention.
Figure 2:
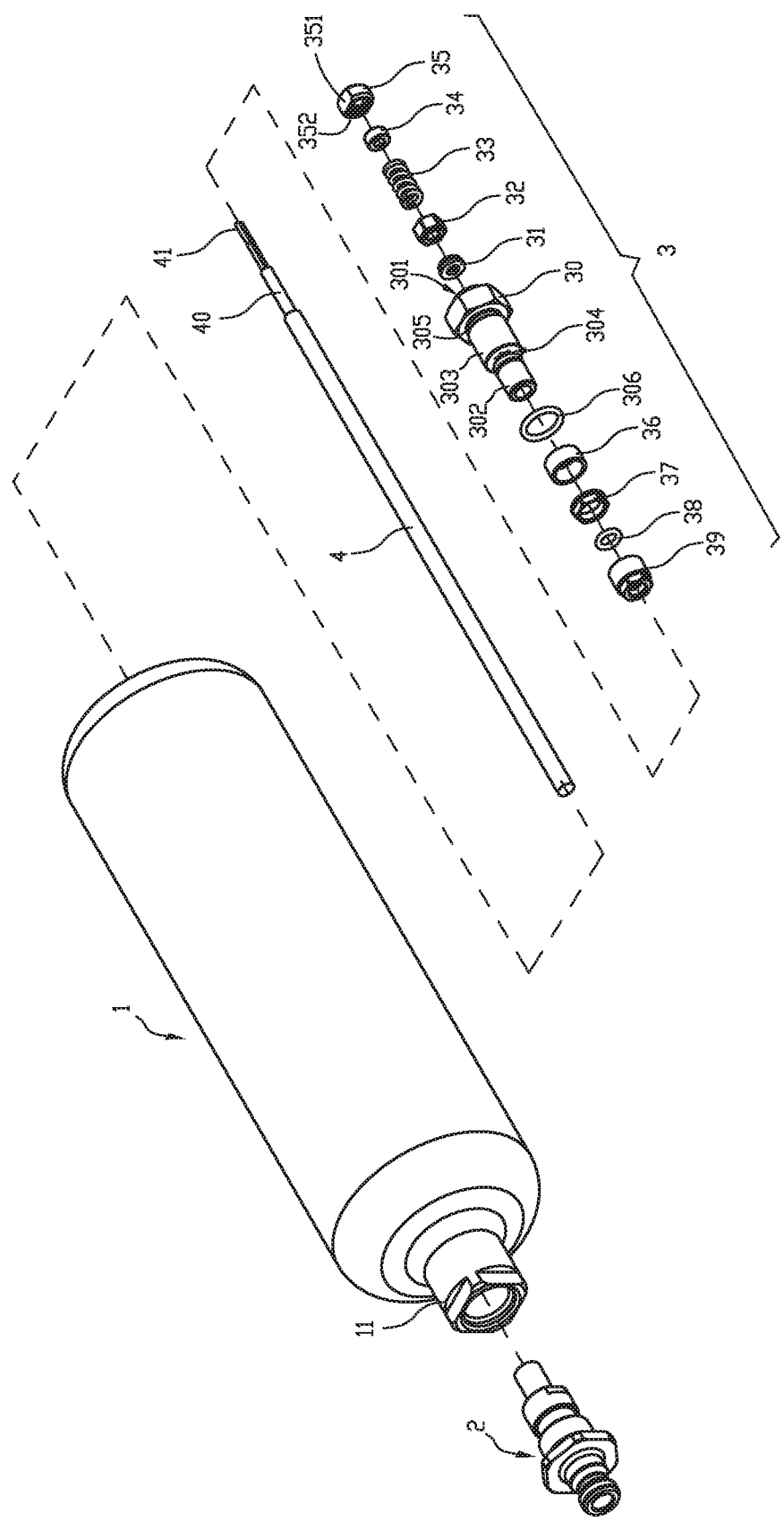
FIG. 2 is a schematic exploded view illustrating the container according to the first embodiment of the present invention.
Figure 3:
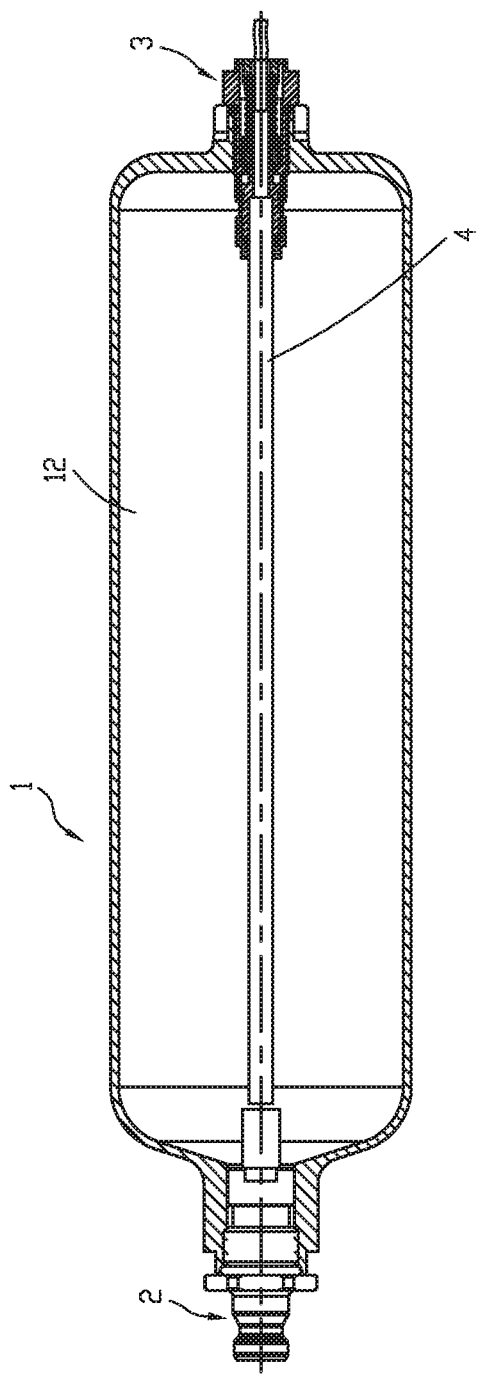
FIG. 3 is a schematic cross-sectional view illustrating the assembled structure of the container according to the first embodiment of the present invention.

FIG. 1 is a schematic perspective view illustrating the outer appearance of a container according to a first embodiment of the present invention. FIG. 2 is a schematic exploded view illustrating the container according to the first embodiment of the present invention. FIG. 3 is a schematic cross-sectional view illustrating the container according to the embodiment of the present invention. As shown in FIGS. 1, 2 and 3, the container comprises a canister body 1, a quick connection terminal 2, a safety device 3 and a heating device 4.

The canister body 1 has a bottom end part 10 and an input/output port 11. According to the practical requirements, the bottom end part 10 and the input/output port 11 are equipped with protrusion structures, inner threads, external threads, and so on. The cross section of the canister body 1 has a circular shape, a cylindrical shape, a triangular shape, a square shape, a polygonal shape or an irregular shape. It is noted that the shape of the cross section of the canister body 1 is not restricted. Preferably but not exclusively, the canister body 1 is made of a metallic material (e.g., steel or aluminum copper) or a carbon fiber-reinforced composite material. Moreover, the container is a gas storage canister or a hydrogen storage canister. Moreover, the canister body 1 has an inner space 12 for accommodating a gas storage material, conduits and thermally conductive materials in order to absorb or release a gas (e.g., hydrogen gas).

The input/output port 11 of the canister body 1 is connected with the quick connection terminal 2. Through the quick connection terminal 2, the canister body 1 is assembled with an application apparatus or a gas charging apparatus (not shown). The bottom end part 10 of the canister body 1 is connected with the safety device 3.

The safety device 3 comprises a main body 30. A channel runs through the front side and the rear side of the main body 30. A receptacle 301 with an inner thread structure is located at a first end of the main body 30. A gasket 31, a valve 32, a spring 33, a fusible plug block 34 and a hollow-type adjustment screw 35 are received within the receptacle 301. The hollow-type adjustment screw 35 comprises a flat part 351 and a slot part 352. Moreover, the hollow-type adjustment screw 35 has an external thread structure matching the inner thread structure of the receptacle 301. Through the hollow-type adjustment screw 35, the force of the spring 33 applied to the valve 32 is adjustable. The gasket 31, the valve 32, the spring 33 and the fusible plug block 34 are hollow structures. Moreover, the outer diameters of the valve 32, the spring 33 and the fusible plug block 34 are smaller than the inner diameter of the receptacle 301. Consequently, the channel is defined by the gap between the inner surface of the receptacle 301 and the gasket 31, the valve 32, the spring 33 and the fusible plug block 34. The channel is used to exhaust gas. Moreover, two external thread structures 302 and 303 are located at a second end of the main body 30. An intermediate concave segment between the external thread structures 302 and 303 comprises plural gas passageways 304. A filter 36 is arranged around the plural gas passageways 304 to cover the plural gas passageways 304. Moreover, the filter 36 is fixed on the external thread structure 302 through a nut 37.

After a first end of the heating device 4 is penetrated through a connection part 40, a packing nut 39, an O ring 38 and the receptacle 301 of the main body 30 of the safety device 3, the first end of the heating device 4 is fixed on the external thread structure 302 of the main body 30. Meanwhile, a wiring part 41 of the heating device 4 is protruded out of the safety device 3. Then, an O ring 306 is locked into a recess 305 of the main body 30. Then, the external thread structure 303 is engaged with the inner thread structure of the protrusion structure at the bottom end part 10 of the canister body 1. Consequently, the safety device 3 and the heating device 4 are securely fixed on the bottom end part 10 of the canister body 1. In addition, the heating device 4 is completely accommodated within the inner space 12 of the canister body 1. As shown in FIG. 3, the efficacy of the gas tightness is enhanced. That is, the gas in the canister body 1 does not leak out. In this embodiment, the heating device 4 is an electric heating element (e.g., an electric heating bar) or any other appropriate heater that generates heat energy. Moreover, the heating body of the heating device 4 is covered by a thermally conductive metal layer. The insulating wiring part 41 at the tail end of the heating device 4 is connected with an external power source. In some other embodiments, the connection part 40 is omitted. According to the practical requirements, the heating device 4 is an integral structure.

Figure 4A:
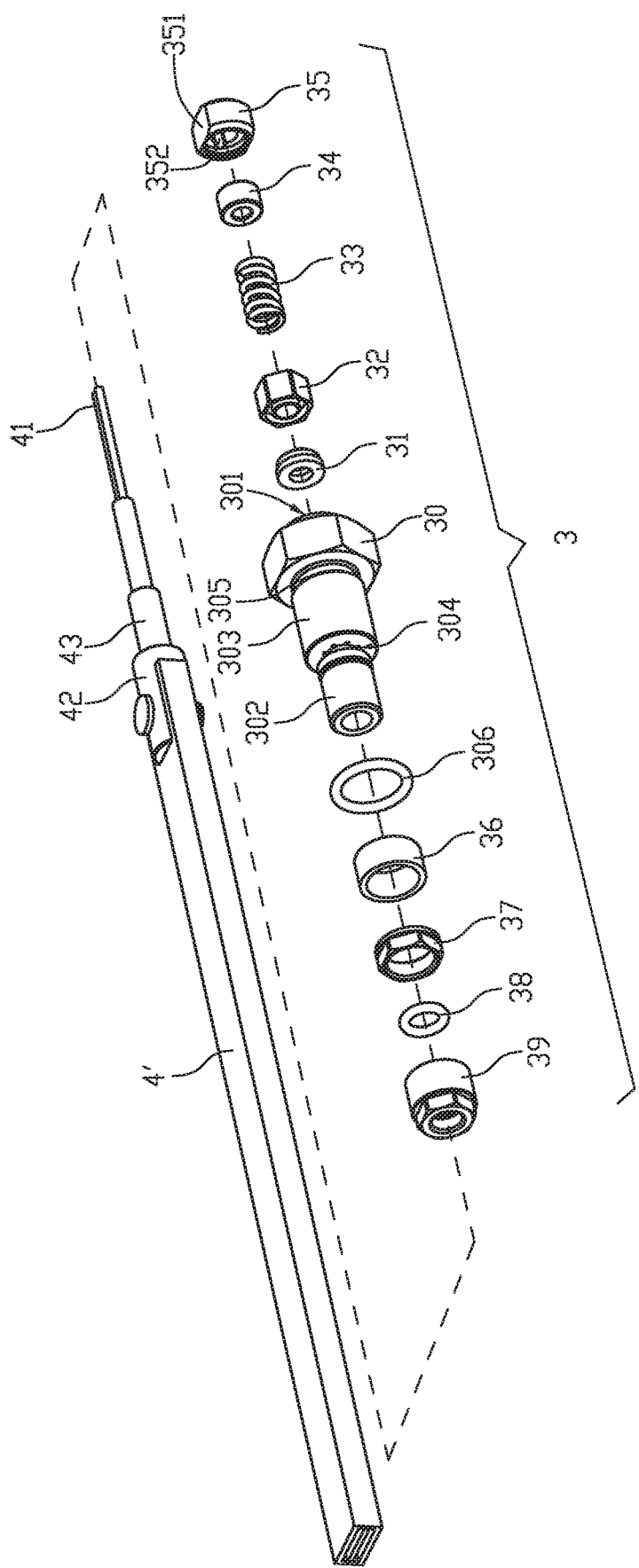
FIG. 4A is a schematic exploded view illustrating a heating device and a safety device of a container according to a second embodiment of the present invention.

FIG. 4A is a schematic exploded view illustrating a heating device and a safety device of a container according to a second embodiment of the present invention. Component parts and elements corresponding to those of FIG. 2 are designated by identical numeral references, and detailed descriptions thereof are omitted. In comparison with the first embodiment, the heating device 4' is a positive temperature coefficient (PTC) thermistor for effectively controlling the temperature in a safe range.

Figure 4C:
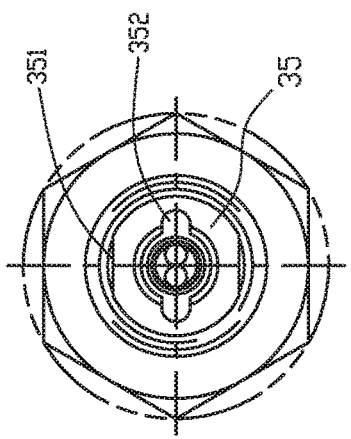
FIG. 4C is a schematic right side view of FIG. 4B.
Figure 4B:
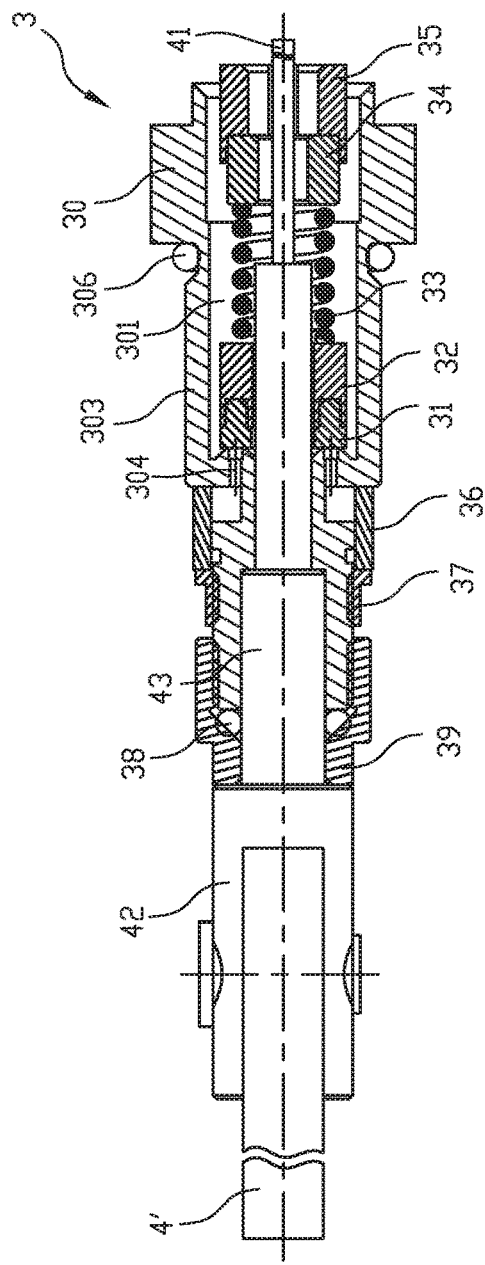
FIG. 4B is a schematic cross-sectional view illustrating the combination of the heating device and the safety device of FIG. 4A.

FIG. 4B is a schematic cross-sectional view illustrating the combination of the heating device and the safety device of FIG. 4A. FIG. 4C is a schematic right side view of FIG. 4B. The heating device 4' include an adapter 42, and the heating device 4' is assembled with the safety device 3 through the adapter 42. Consequently, the combination of the heating device 4' and the safety device 3 is substantially arranged in a line. The wiring part 41 of the heating device 4' is penetrated through the channel and the receptacle 301 of the main body 30 and protruded out of the safety device 3. The wiring part 41 is connected with an external power source (not shown). Moreover, a supporting part 43 of the adapter 42 is fixed on the main body 30 of the safety device 3 through the packing nut 39 and the O ring 38. That is, the adapter 42 is connected with the main body 30 in a gas-tight manner. The gasket 31, the valve 32, the spring 33, the fusible plug block 34 and the hollow-type adjustment screw 35 with the flat part 351 and the slot part 352 are received within the receptacle 301. Moreover, the hollow-type adjustment screw 35 has an external thread structure matching the inner thread structure of the receptacle 301. Through the hollow-type adjustment screw 35, the force of the spring 33 applied to the valve 32 is adjustable. The gasket 31, the valve 32, the spring 33 and the fusible plug block 34 are hollow structures. Moreover, the outer diameters of the valve 32, the spring 33 and the fusible plug block 34 are smaller than the inner diameter of the receptacle 301. Consequently, the channel is defined by the gap between the inner surface of the receptacle 301 and the gasket 31, the valve 32, the spring 33 and the fusible plug block 34. The channel is used to exhaust gas. An intermediate concave segment of the main body 30 of the safety device 3 comprises the plural gas passageways 304. The filter 36 is arranged around the plural gas passageways 304 to cover the plural gas passageways 304. Moreover, the filter 36 is fixed on the main body 30 through the nut 37. After the O ring 306 is locked into the recess 305 of the main body 30, the external thread structure 303 is engaged with the inner thread structure of the protrusion structure at the bottom end part 10 of the canister body 1. Consequently, the safety device 3 and the heating device 4' are securely fixed on the bottom end part 10 of the canister body 1. In addition, the heating device 4' is completely accommodated within the inner space 12 of the canister body 1. Consequently, the efficacy of the gas tightness is enhanced, and the gas in the canister body 1 does not leak out. In some other embodiments, the adapter 42 and the supporting part 43 are omitted. According to the practical requirements, the heating device 4' is an integral structure formed in one piece.

Figure 5A:
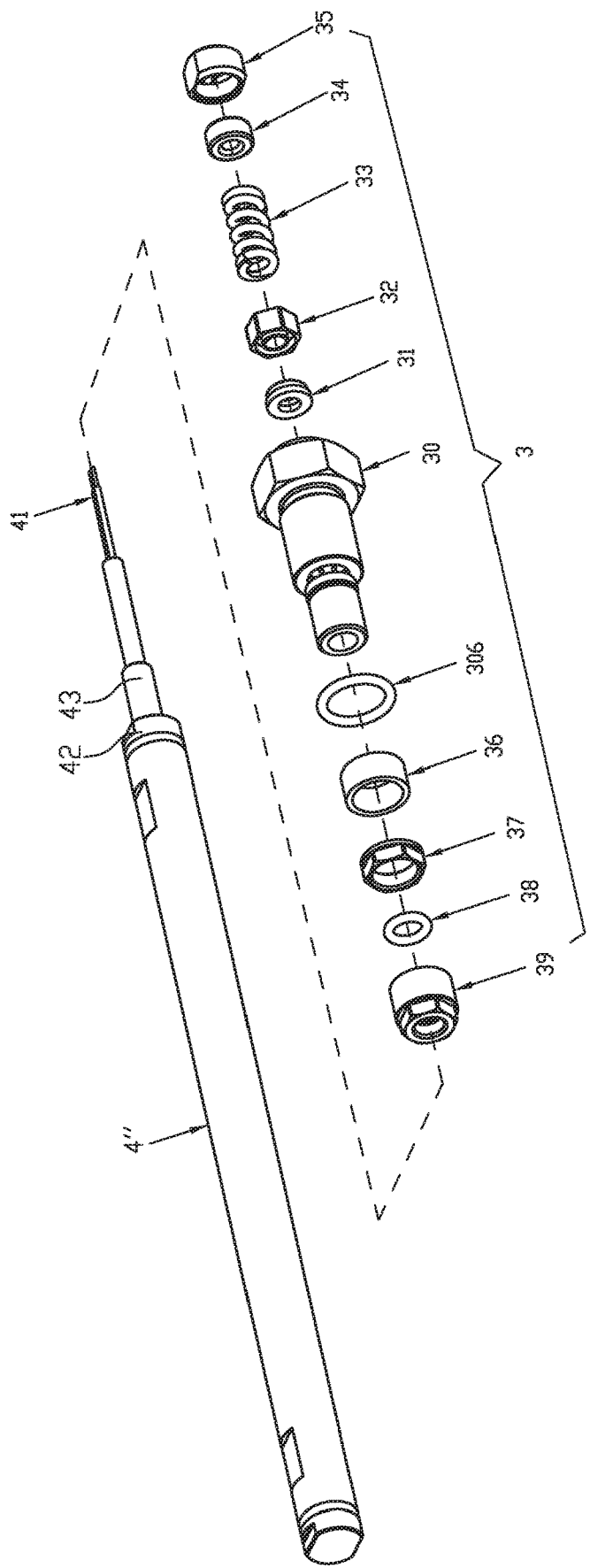
FIG. 5A is a schematic exploded view illustrating a heating device and a safety device of a container according to a third embodiment of the present invention.
Figure 5B:
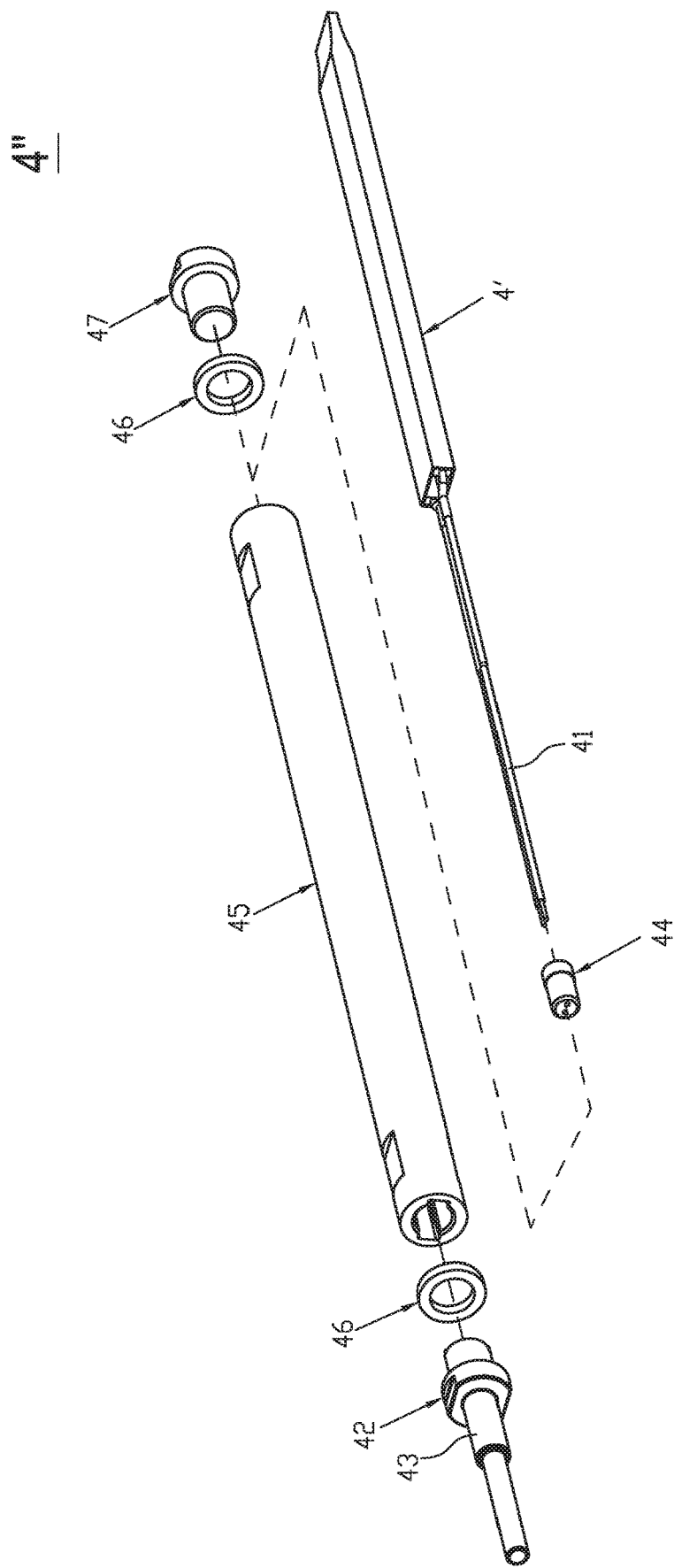
FIG. 5B is a schematic exploded view illustrating the heating device of FIG. 5A.
Figure 5D:
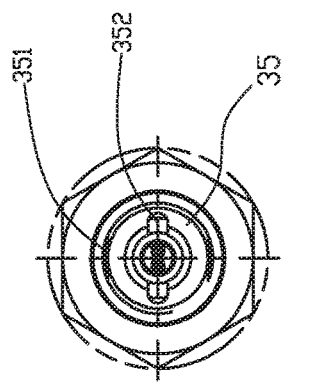
FIG. 5D is a schematic right side view of FIG. 5C.
Figure 5C:
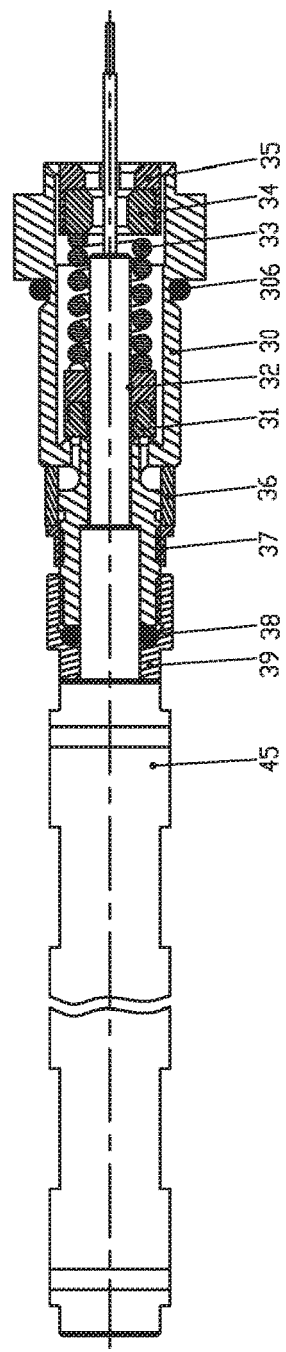
FIG. 5C is a schematic cross-sectional view illustrating the combination of the heating device and the safety device of FIG. 5A.
Figure 6:
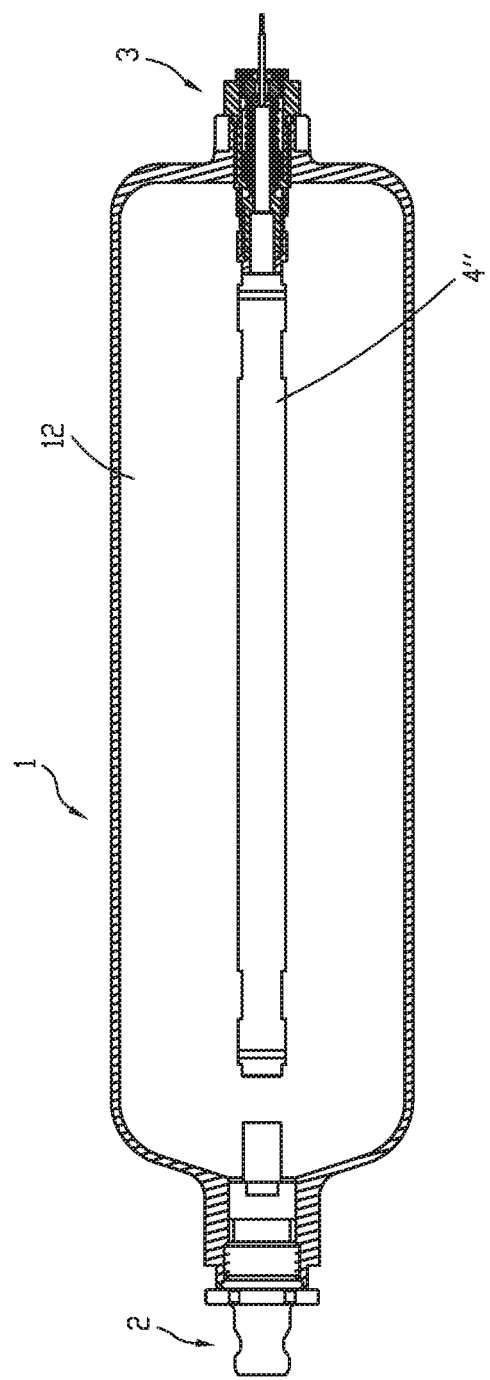
FIG. 6 is a schematic cross-sectional view illustrating the assembled structure of the container according to the third embodiment of the present invention.

FIG. 5A is a schematic exploded view illustrating a heating device and a safety device of a container according to a third embodiment of the present invention, FIG. 5B is a schematic exploded view illustrating the heating device of FIG. 5A, FIG. 5C is a schematic cross-sectional view illustrating the combination of the heating device and the safety device of FIG. 5A, FIG. 5D is a schematic right side view of FIG. 5C, and FIG. 6 is a schematic cross-sectional view illustrating the assembled structure of the container according to the third embodiment of the present invention. Component parts and elements corresponding to those of FIGS. 4A to 4C are designated by identical numeral references, and detailed descriptions thereof are omitted. In comparison with the second embodiment as shown in FIGS. 4A to 4C, the heating device 4" of this embodiment includes a heating element 4' having a wire part 41, an adapter 42 with a supporting part 43, a plug 44, a sleeve 45, two sealing rings 46 and a nut 37. The sleeve 45 is made of thermally-conductive material or metal material. The wire part 41 of the heating element 4' is penetrated through the plug 44 firstly, and then inserted into the sleeve 45, penetrated through one sealing ring 46 and the adapter 42 with the supporting part 43. Consequently, the wire part 41 is protruded out of the sleeve 45. Then, two ends of the sleeve 45 are assembled with the adapter 42 and the nut 47 through the sealing rings 46, respectively. Consequently, the heating element 4' is installed in the interior of the sleeve 45 and sealed by the adapter 42 and the nut 47 so as to achieve the assembly of the heating device 4". In this embodiment, the method and structure of assembling the heating device 4" and the safety device 3 are the same as that of the second embodiment of FIGS. 4A to 4C, and aren't described redundantly hereinafter.

Figure 7A:
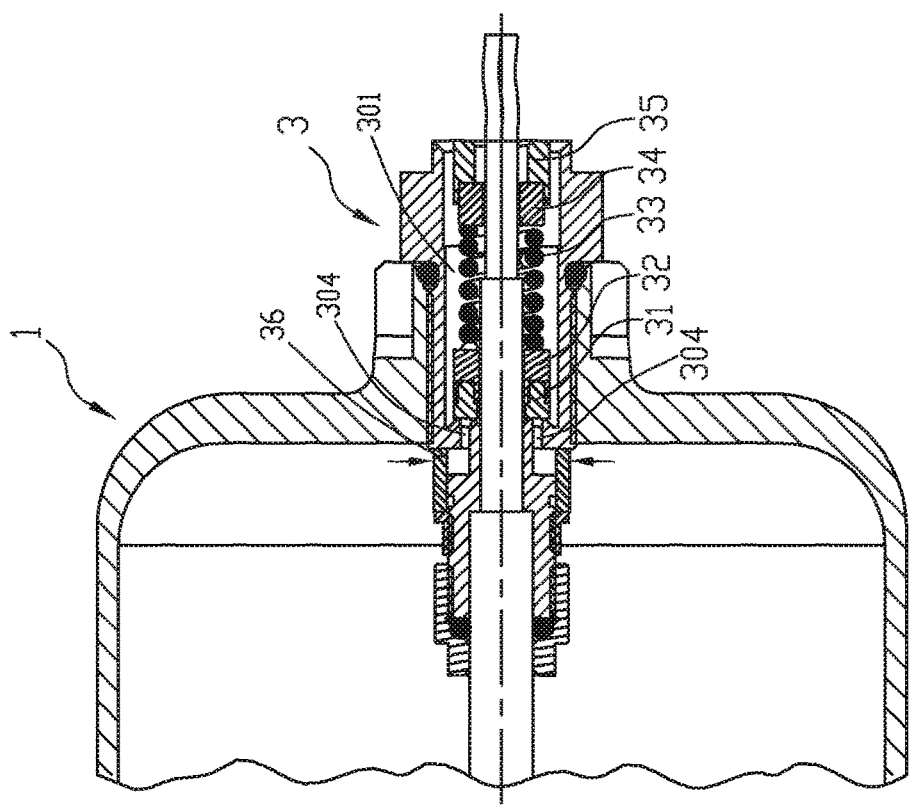
FIG. 7A schematically illustrates the actions of the safety device of the container when the valve is opened.
Figure 7B:
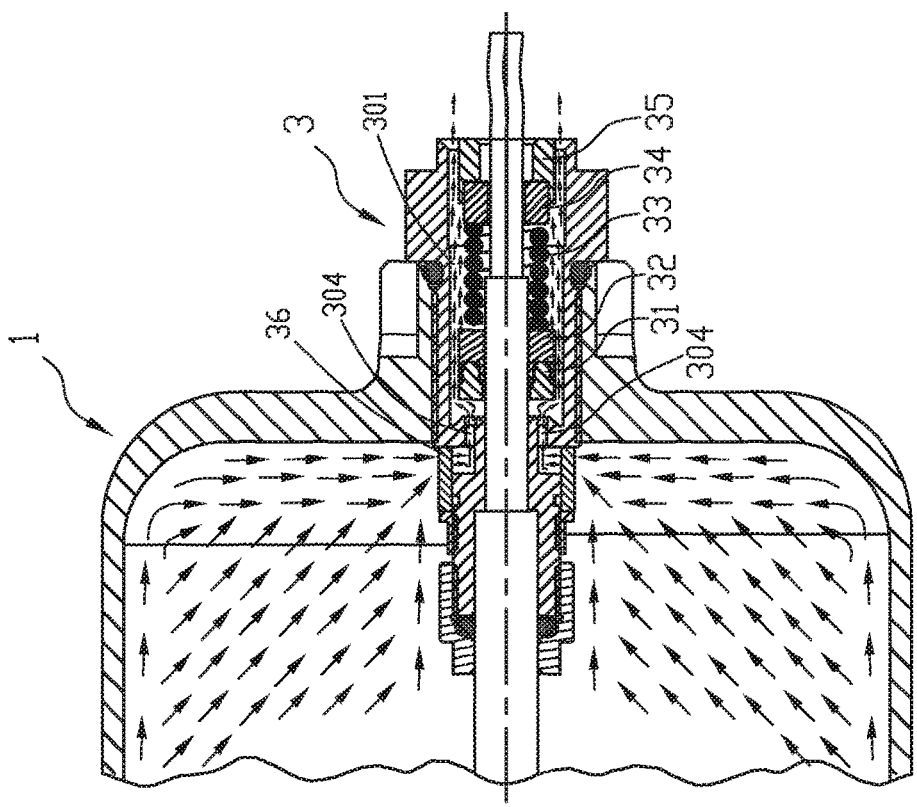
FIG. 7B schematically illustrates the actions of the safety device of the container when the valve is closed.

FIG. 7A schematically illustrates the actions of the safety device of the container when the valve is opened. FIG. 7B schematically illustrates the actions of the safety device of the container when the valve is closed. When the pressure of the inner space 12 of the canister body 1 is higher than a predetermined pressure value, the gas in the inner space 12 is released. Since the pressure is reduced, the purpose of protecting the canister body 1 is achieved. For example, the predetermined pressure value is in the range between 450 psi and 700 psi, preferably in the range between 500 psi and 650 psi, and more preferably 600 psi. If the charging pressure or the internal pressure is higher than the predetermined pressure value, the gas flows into the safety device 3 through the filter 36. After the gas flows through the gas passageways 304, the gas pushes the gasket 31, the valve 32 and the spring 33. In response to the force of gas, the spring 33 is compressed and the valve 32 is opened. Consequently, the gas quickly flows to the flat part 351 of the hollow-type adjustment screw 35 through the channel of the receptacle 301 and releases to the surroundings. Under this circumstance, the pressure is reduced.

After the pressure is reduced, the spring 33 of the safety device 3 is no longer pushed by the gas. Consequently, the spring 33 is returned to its original position, and the gas passageways 304 are closed by the gasket 31 and the valve 32. As shown in FIG. 7B, the canister body 1 is not damaged, and the canister body 1 can be continuously charged with the gas.

When the temperature of the inner space 12 of the canister body 1 is higher than a predetermined temperature value, it is necessary to release the gas to protect the canister body 1. For example, the predetermined temperature value is in the range between 100° C. and 140° C., preferably in the range between 110° C. and 130° C., and more preferably 120° C. In some situations, the heating device 4 is out of control, and the temperature is higher than the predetermined temperature value. Meanwhile, since the pressure of the gas in the inner space 12 of the canister body 1 is not higher than the predetermined pressure value, the valve 32 is not activated or opened. However, since the temperature reaches the melting point of the fusible plug block 34, the fusible plug block 34 is gradually molten. As the fusible plug block 34 is gradually molten, the area of the fusible plug block 34 to sustain against the spring 33 is gradually lost. When the gasket 31 and the valve 32 are not pushed by the spring 33, the gasket 31 and the valve 32 are pushed by the gas and the valve 32 is opened. Consequently, the gas quickly flows to the flat part 351 of the hollow-type adjustment screw 35 through the channel of the receptacle 301 and releases to the surroundings. Under this circumstance, the pressure is reduced. Moreover, if the external flame is applied to the container, the above safety measurement is also taken.

Figure 8:
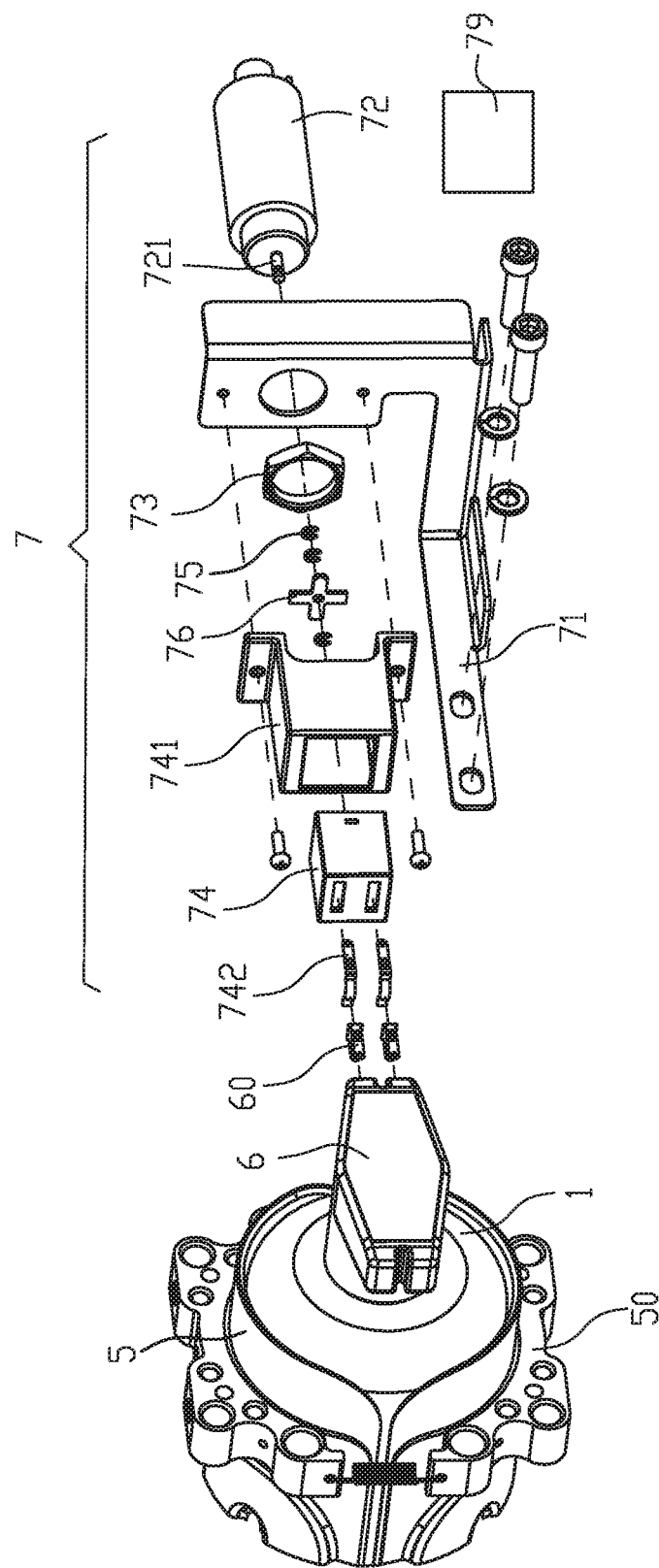
FIG. 8 schematically illustrates a first example of connecting the container with an external power source.
Figure 9B:
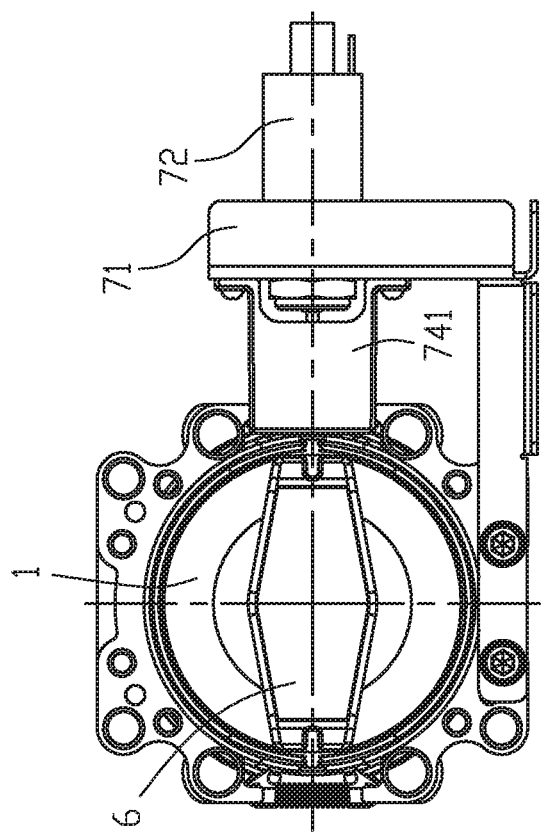
FIG. 9B schematically illustrates the disconnection between the container and the power supply unit.
Figure 9A:
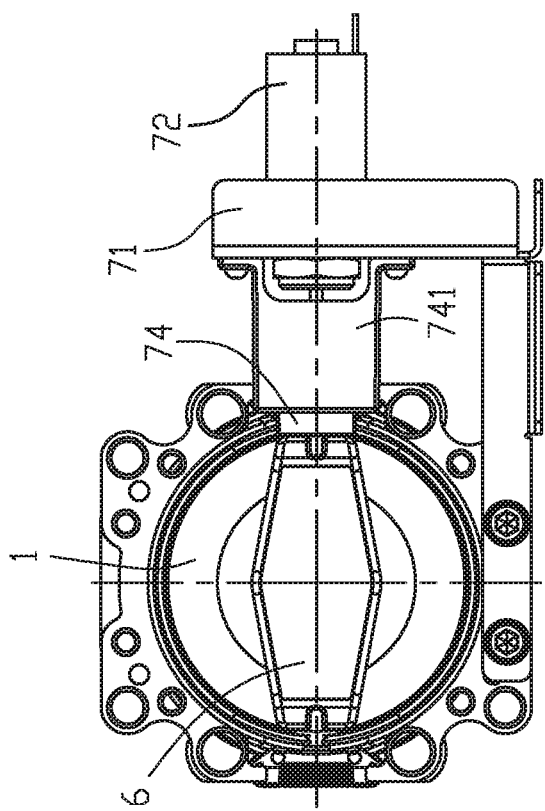
FIG. 9A schematically illustrates the connection between the container and the power supply unit.

FIG. 8 schematically illustrates a first example of connecting the container with an external power source. As shown in FIG. 8, the canister body 1 is placed within a water jacket 5. The bottom end part of the canister body 1 is connected with a handle 6. The handle 6 comprises conducting slices 60. The wiring part 41 of the heating device 4 is connected with the conducting slices 60 of the handle 6 through a welding means or a conducting element. Moreover, a power supply unit 7 with an automatic temperature control function is connected with an end 50 of the water jacket 5. The power supply unit 7 is connected with an electromagnet 72 through a bracket 71. An end of the electromagnet 72 is fixed on the bracket 71 through a nut 73. An elastic strip seat 74 is fixed on the bracket 71 through an outer shell 741. Moreover, conductive elastic strips 742 are received in an end of the spring strip seat 74 and connected with a power control unit 79. A movable post 721 of the electromagnet 72 is connected with the elastic strip seat 74 through a fastening ring 75 and a push plate 76. When the canister body 1 is placed and positioned within the water jacket 5, the conducting slices 60 of the handle 6 are in front of the spring strip seat 74. By a manual method of operating a switch or by an automatic control method, the movable post 721 of the electromagnet 72 is moved forwardly. As the movable post 721 is moved forwardly, the conductive elastic strips 742 of the elastic strip seat 74 are connected with the conducting slices 60 of the handle 6. Consequently, the heating device 4 within the canister body 1 is powered on (see FIG. 9A). When the movable post 721 of the electromagnet 72 is retracted backwardly, the conductive elastic strips 742 of the elastic strip seat 74 are disconnected from the conducting slices 60 of the handle 6. Consequently, the heating device 4 within the canister body 1 is powered off (see FIG. 9B). In an embodiment, the power supply unit 7 provides electric energy according to wireless electromagnetic induction, radio waves or nuclear magnetic resonance. Moreover, the handle of the container is in communication with a database according to a RFID technology. Consequently, the specification of the container, the type of the stored gas, the number of use times and the maintenance history are recorded in the database.

Figure 11:
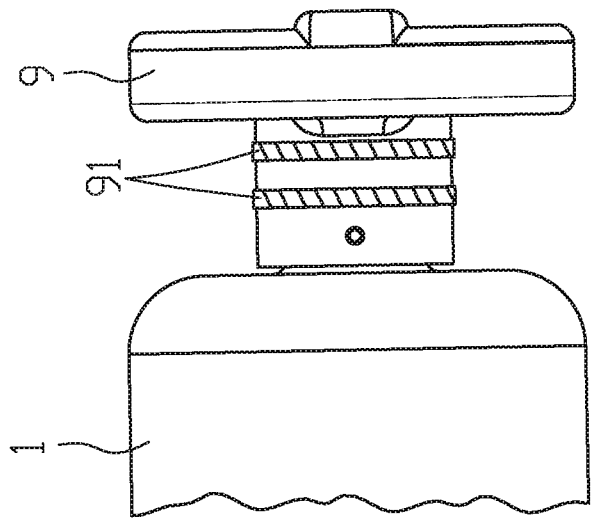
FIG. 11 schematically illustrates another example of connecting the heating device with the handle.
Figure 10:
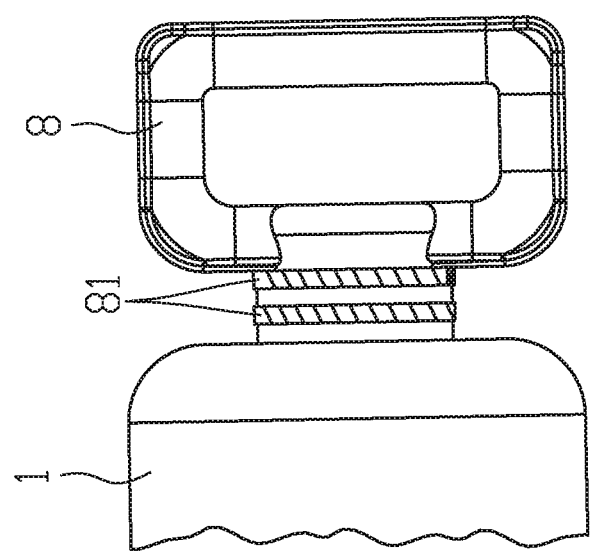
FIG. 10 schematically illustrates an example of connecting the heating device with the handle.

The way of connecting the wiring part 41 of the heating device 41 and the handle may be varied according to the practical requirements. FIG. 10 schematically illustrates an example of connecting the heating device with the handle. As shown in FIG. 10, the square handle 8 has two ring-shaped conducting slices 81 corresponding to the junction between the canister body 1, the safety device 3 and the heating device 4 in order to be electrically connected with the external power source. FIG. 11 schematically illustrates another example of connecting the heating device with the handle. As shown in FIG. 11, the circular handle 9 has two ring-shaped conducting slices 91 corresponding to the junction between the canister body 1, the safety device 3 and the heating device 4 in order to be electrically connected with the external power source.

Figure 12B:
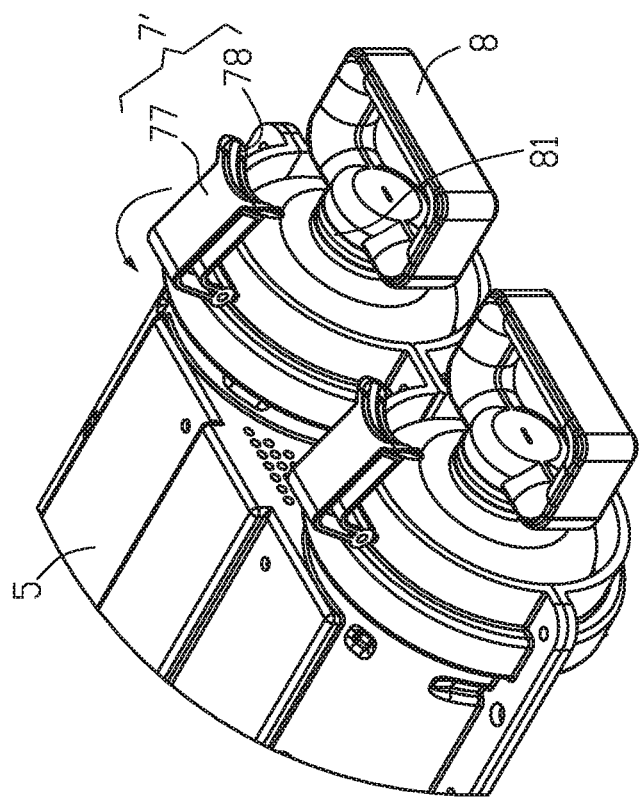
FIGS. 12A and 12B schematically illustrate a second example of connecting the container with an external power source.
Figure 12A:
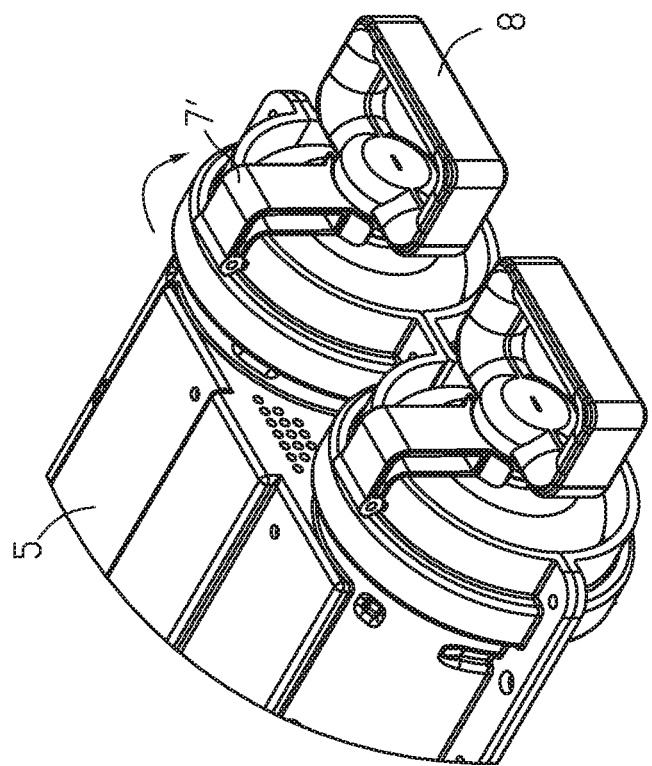

FIGS. 12A and 12B schematically illustrate a second example of connecting the container with an external power source. Two power supply units 7' with the automatic temperature control function are connected with the end of the water jacket 5. When a linkage lever 77 is moved downwardly and locked through a fastening means, an elastic strip or an elastic force, the conductive elastic strips 78 at an end of the linkage lever 77 are tightly contacted with the conducting slices 81 of the square handle 8. Consequently, the heating device 4 within the canister body 1 is powered on (see FIG. 12A). When the linkage lever 77 is moved upwardly or unlocked, the conductive elastic strips 78 are disconnected from the conducting slices 81 of the square handle 8. Consequently, the heating device 4 within the canister body 1 is powered off (see FIG. 12B).

Figure 13B:
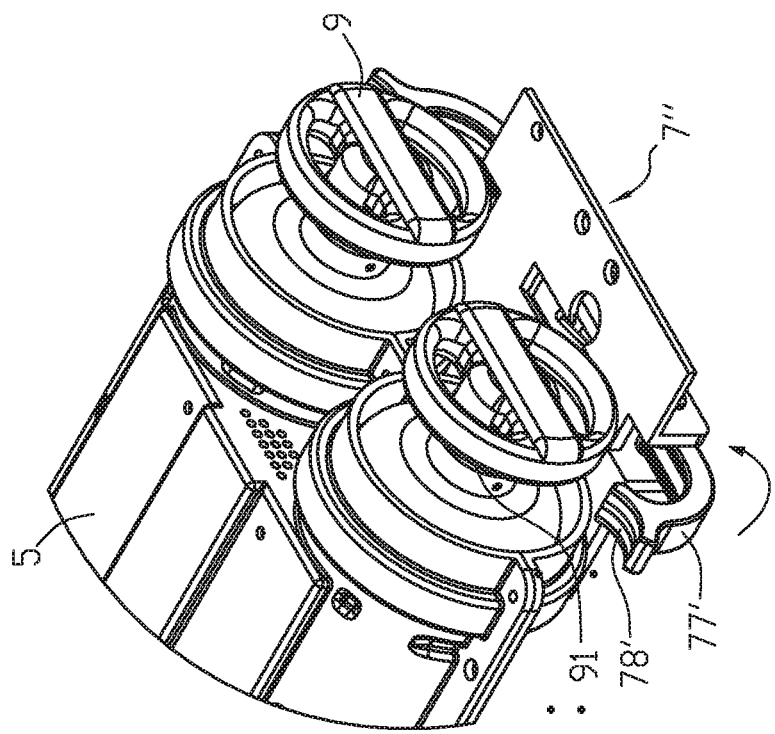
FIGS. 13A and 13B schematically illustrate a third example of connecting the container with an external power source.
Figure 13A:
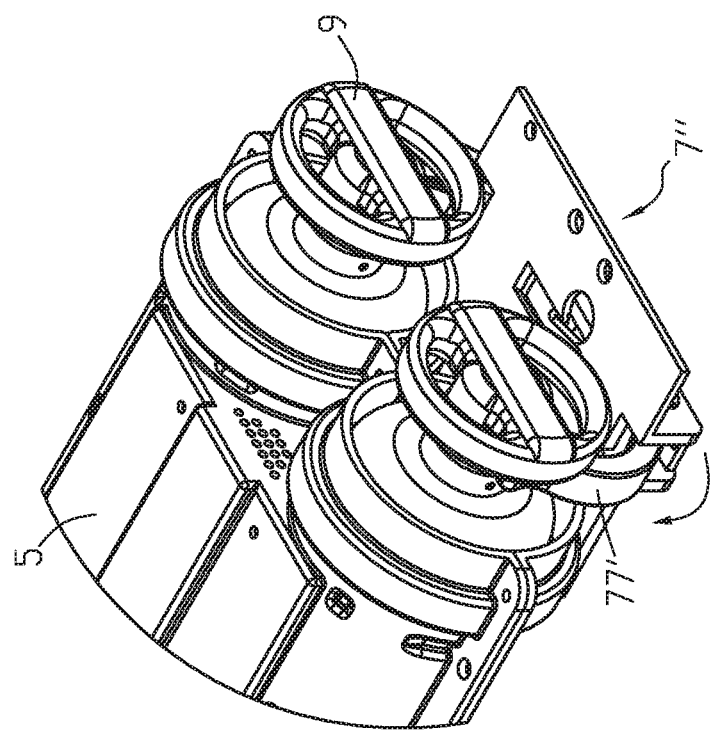

FIGS. 13A and 13B schematically illustrate a third example of connecting the container with an external power source. Two power supply units 7" with the automatic temperature control function are connected with the end of the water jacket 5. When a linkage lever 77' is moved downwardly and locked through a fastening means, an elastic strip or an elastic force, the conductive elastic strips 78' at an end of the linkage lever 77' are tightly contacted with the conducting slices 91 of the circular handle 9. Consequently, the heating device 4 within the canister body 1 is powered on (see FIG. 13A). When the linkage lever 77' is moved upwardly or unlocked, the conductive elastic strips 78 are disconnected from the conducting slices 91 of the circular handle 9. Consequently, the heating device 4 within the canister body 1 is powered off (see FIG. 13B).

Figure 14:
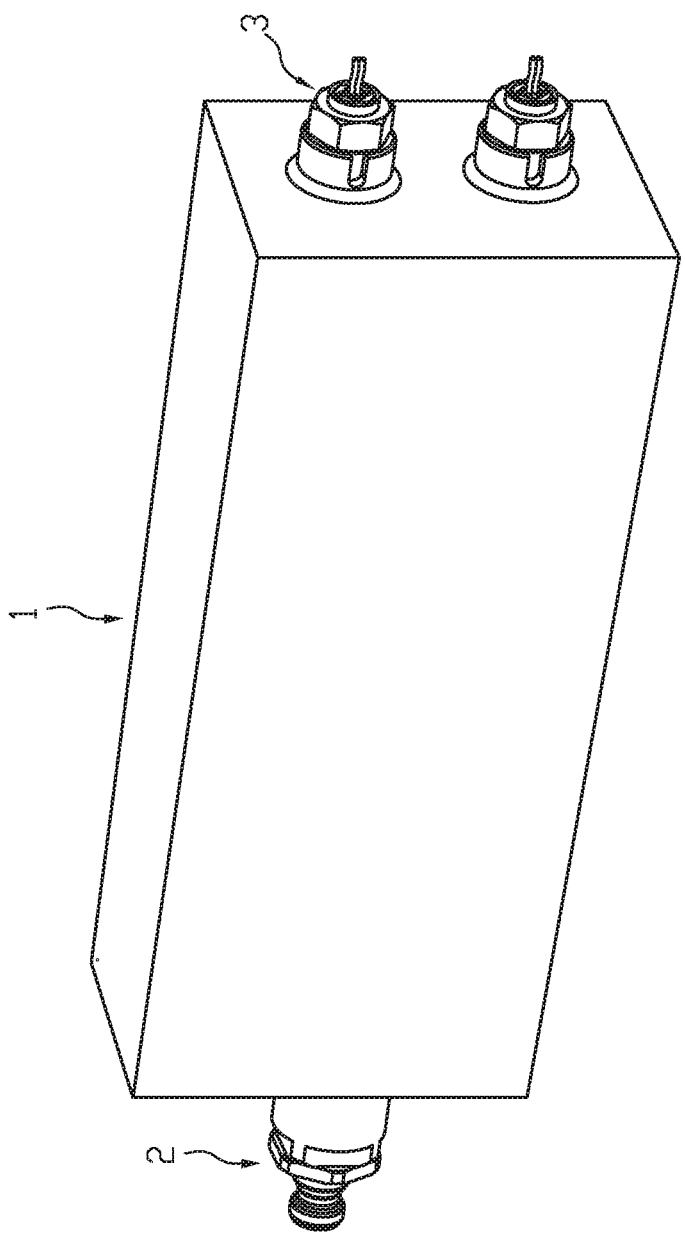
FIG. 14 is a schematic perspective view illustrating the outer appearance of a container according to a fourth embodiment of the present invention.

From the above descriptions, the heating device is individually and directly used to provide heat energy to the gas storage material to release the gas. Especially, in the cold start of the full cell system (e.g., the temperature is lower than 15° C. or the internal pressure of the canister body is lower than 35 psi), the cooperation of the container with the fuel cell system and the external water tank or water jacket can achieve the power-saving purpose. Moreover, the number of the heating devices can be varied according to the practical requirements. FIG. 14 is a schematic perspective view illustrating the outer appearance of a container according to a third embodiment of the present invention. As shown in FIG. 14, the container comprises a canister body 1, a quick connection terminal 2, two safety devices 3 and two heating devices (not shown). Consequently, the drawbacks of the conventional technology (e.g., the unsuccessful cold start problem) can be overcome. Moreover, the container of the present invention can be operated and used in a simplified manner. Since the gas storage material is uniformly and stably heated, the efficiency of charging/discharging the gas (e.g., hydrogen gas) is enhanced. Moreover, the installation of the safety device can protect the canister body.

The predetermined pressure value or the predetermined temperature value may be varied according to the practical conditions and environments. For example, if external flame is applied to the container, the protecting mechanism is enabled when the temperature reaches the predetermined temperature value. As the temperature increases, the internal pressure of the canister body also increases. When the pressure reaches the predetermined pressure value, the protecting mechanism is also enabled. The manufacturer has to set the suitable predetermined pressure value and the suitable predetermined temperature value to have the container comply with the environmental conditions. In the above embodiment, the most preferred predetermined pressure value is 600 psi and the most predetermined temperature value is 120° C. It is noted that these values may be varied according to the environmental conditions.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A container, comprising:
    a canister body comprising an inner space for storing a gas storage material;
    at least one heating device accommodated within an inner space of the canister body for heating the gas storage material, so that the gas storage material releases a gas, wherein the heating device comprises:
        a sleeve;
        a plug;
        at least two sealing rings;
        an adapter with a supporting part;
        a nut; and
        a heating element having a wire part, wherein the wire part of the heating element is penetrated through the plug, and then inserted into the sleeve, penetrated through one of the two sealing rings and the adapter with the supporting part, and protruded out of the sleeve, wherein two ends of the sleeve are assembled with the adapter and the nut through the two sealing rings respectively, so that the heating element is installed in an interior of the sleeve and sealed by the adapter and the nut; and
    at least one safety device connected with the corresponding heating device and installed on an end part of the canister body, wherein when a temperature of the inner space is higher than a predetermined temperature value or a pressure of the inner space is higher than a predetermined pressure value, a portion of the gas is released through the safety device.

2. The container according to claim 1, wherein the heating device is an electric heating bar or a heater.

3. The container according to claim 2, wherein a heating body of the heating device is covered by a thermally conductive metal layer.

4. The container according to claim 1, wherein the heating device is a positive temperature coefficient thermistor.

5. The container according to claim 4, wherein the heating device comprises an adapter, and the heating device is assembled with the safety device through the adapter.

6. The container according to claim 1, wherein the sleeve is made of thermally-conductive material or metal material.

7. The container according to claim 1, wherein the safety device comprises a main body with a receptacle, wherein a gasket, a valve, a spring, a fusible plug block and a hollow-type adjustment screw are received within the receptacle.

8. The container according to claim 7, wherein the hollow-type adjustment screw comprises a flat part and a slot part.

9. The container according to claim 7, wherein an outer diameter of each of the gasket, the valve, the spring and the fusible plug block is smaller than an inner diameter of the receptacle, so that a channel is defined by a gap between an inner surface of the receptacle and the gasket, the valve, the spring and the fusible plug block.

10. The container according to claim 9, wherein when the temperature is higher than the predetermined temperature value or the pressure is higher than the predetermined pressure value, a portion of the gas is released to an outside of the safety device through the channel.

11. The container according to claim 7, wherein when the temperature of the inner space reaches the predetermined temperature value, the fusible plug block is molten.

12. The container according to claim 7, wherein the safety device comprises an O ring and a packing nut, and the heating device is fixed on the safety device through the O ring and the packing nut.

13. The container according to claim 7, wherein an intermediate segment of the main body of the safety device comprises plural gas passageways.

14. The container according to claim 13, wherein the safety device further comprises a filter, and the filter is arranged around the plural gas passageways to cover the plural gas passageways.

15. The container according to claim 1, wherein the end part of the canister body is further connected with a handle, and the container is electrically connected with a power supply unit through the handle.

16. The container according to claim 1, wherein the container is a gas storage canister.

17. The container according to claim 1, wherein the container is a hydrogen storage canister.

18. The container according to claim 1, wherein the heating device further comprises a wiring part, which is protruded out of the safety device.

* * * * *